(12) United States Patent
Greenberger

(10) Patent No.: US 10,165,408 B2
(45) Date of Patent: *Dec. 25, 2018

(54) SYSTEM AND METHOD FOR DEFINING ZONES FOR LOCATION-BASED SERVICES

(71) Applicant: International Business Machines Corporation, Armonk, NY (US)

(72) Inventor: Jeremy A. Greenberger, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/997,072

(22) Filed: Jun. 4, 2018

(65) Prior Publication Data

US 2018/0288571 A1   Oct. 4, 2018

Related U.S. Application Data

(63) Continuation of application No. 15/183,852, filed on Jun. 16, 2016, now Pat. No. 10,034,132.

(51) Int. Cl.
| | | |
|---|---|---|
| H04W 4/02 | (2018.01) | |
| H04W 4/021 | (2018.01) | |
| H04W 48/16 | (2009.01) | |

(52) U.S. Cl.
CPC ......... *H04W 4/023* (2013.01); *H04W 4/021* (2013.01); *H04W 48/16* (2013.01)

(58) Field of Classification Search
CPC ......... H04W 64/00; H04W 4/00; H04W 4/02; H04W 4/023
See application file for complete search history.

(56) References Cited

U.S. PATENT DOCUMENTS

| | | | |
|---|---|---|---|
| 8,024,234 B1 | 9/2011 | Thomas et al. | |
| 8,442,552 B2 | 5/2013 | Gallegos | |
| 8,989,779 B1 | 3/2015 | Centore, III | |
| 9,269,093 B2 | 2/2016 | Lee et al. | |
| 2002/0046071 A1 | 4/2002 | Walker et al. | |
| 2009/0043504 A1* | 2/2009 | Bandyopadhyay | .... G01C 17/38 701/469 |
| 2011/0060950 A1 | 3/2011 | Waldron et al. | |
| 2012/0191223 A1 | 7/2012 | Dharwada et al. | |
| 2012/0268252 A1* | 10/2012 | Lee | .......... G06Q 10/06316 340/10.1 |
| 2013/0344897 A1 | 12/2013 | Pierce, II et al. | |
| 2014/0236434 A1 | 8/2014 | Sujan et al. | |

(Continued)

OTHER PUBLICATIONS

IP.com, "Smartphone based indoor environmental monitoring for home automation systems", An IP.com Prior Art Database Technical Disclosure, IP.com No. IPCOM000244369D, IP.com Electronic Publication Date: Dec. 7, 2015, 8 pages.

(Continued)

*Primary Examiner* — Kamran Afshar
*Assistant Examiner* — Farideh Madani
(74) *Attorney, Agent, or Firm* — Isaac T. Gooshaw; Maxine L. Barasch; Keohane & D'Alessandro PLLC

(57) ABSTRACT

Embodiments of the present invention provide a system and method for defining zones used in location-based services. A mobile device with administrative privileges is moved in a path within a venue. The path is recorded and the interior of the path forms a zone. Additionally, embodiments provide for modification of existing zones based on a recorded path from the mobile device.

20 Claims, 18 Drawing Sheets

(56) References Cited

U.S. PATENT DOCUMENTS

| | | |
|---|---|---|
| 2014/0269318 A1 | 9/2014 | Hasarchi et al. |
| 2014/0274357 A1 | 9/2014 | Nguyen et al. |
| 2014/0287736 A1 | 9/2014 | Meers |
| 2015/0004320 A1 | 1/2015 | Perret et al. |
| 2015/0024725 A1 | 1/2015 | Lang et al. |
| 2015/0230050 A1 | 8/2015 | Barneson et al. |
| 2015/0237470 A1 | 8/2015 | Mayor et al. |
| 2015/0348146 A1 | 12/2015 | Shanmugam et al. |
| 2016/0050525 A1 | 2/2016 | Droll et al. |
| 2016/0127636 A1 | 5/2016 | Ito et al. |
| 2017/0366934 A1 | 12/2017 | Greenberger |

OTHER PUBLICATIONS

Sandro Rodriguez Garzon et al., "Infrastructure-assisted Geofencing: Proactive Location-based Services with Thin Mobile Clients and Smart Servers", 2015 3rd IEEE International Conference on Mobile Cloud Computing, Services, and Engineering, Copyright 2015 IEEE, pp. 61-70.

Jay Donovan, "Indoor Mapping Startup Meridian Adds Notification Zones to Their Strategy", http://techcrunch.com/2013/05/15/indoor-mapping-startup-meridian-add. . . , May 15, 2013, 8 pages.

Madani, Farideh, U.S. Appl. No. 15/183,852, Office Action dated Nov. 4, 2016, 33 pgs.

Madani, Farideh, U.S. Appl. No. 15/183,852, Final Office Action dated Mar. 3, 2017, 19 pgs.

Madani, Farideh, U.S. Appl. No. 15/183,852, Office Action dated Oct. 3, 2017, 19 pgs.

Madani, Farideh, U.S. Appl. No. 15/183,852, Notice of Allowance dated Mar. 8, 2018, 11 pgs.

\* cited by examiner

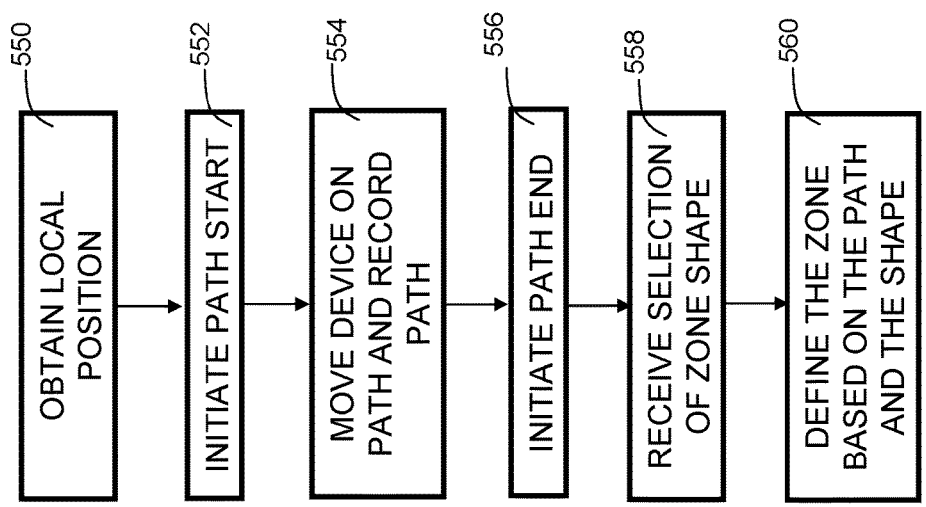

SYSTEM AND METHOD FOR DEFINING ZONES FOR LOCATION-BASED SERVICES

FIELD OF THE INVENTION

The present patent document is a continuation of U.S. patent application Ser. No. 15/183,852 now U.S. Pat. No. 10,034,132 B2, filed Jun. 16, 2016, entitled "SYSTEM AND METHOD FOR DEFINING ZONES FOR LOCATION-BASED SERVICES", the disclosure of which is incorporated herein by reference. The present invention relates generally to formation and modification of zones used in location-based services.

BACKGROUND

Mobile devices such as smart phones and tablets have become commonplace consumer items. Many people carry such a device with them as they shop, or otherwise go about their day. These devices have the communication and processing capability to perform location-aware functionality. Modern retail establishments often include multiple departments such as groceries, home goods, shoes, and jewelry, to name a few. This technology allows for an interactive shopping experience in a physical "brick-and-mortar" retail establishment that provides some features of an online shopping experience. Customers can use their mobile devices such as cell phones, tablet computers, and/or wearable technology as part of a retail shopping experience. As more and more consumers obtain such mobile devices, it is desirable to have improvements in interactive retail shopping experiences.

SUMMARY

Embodiments of the present invention provide a system and method for defining zones used in location-based services. A mobile device with administrative privileges is moved in a path within a venue. The path is recorded and the interior of the path forms a zone. Additionally, embodiments provide for modification of existing zones based on a recorded path from the mobile device.

In one aspect, embodiments of the present invention provide a computer-implemented method for defining a zone within a location detection system at a venue, comprising: obtaining local position data of the mobile device within the venue; determining a first position of a mobile device within the venue; initiating a path start for a path; moving the mobile device along the path to a second position, while recording location information of the path; initiating a path end for the path; and defining a region bounded by the path as a zone within the venue.

In another aspect, embodiments of the present invention provide a mobile device comprising: a processor; a memory coupled to the processor; a network interface coupled to the processor; a local receiver coupled to the processor; wherein the memory contains instructions, which when executed by the processor, perform the steps of: obtaining local position data of the mobile device within a venue; determining a first position of a mobile device within the venue; initiating a path start for a path; moving the mobile device along the path to a second position, while recording location information of the path; initiating a path end for the path; and defining a region bounded by the path as a zone within the venue.

In another aspect, embodiments of the present invention provide a computer program product for adjustment of an electronic display of an electronic device, comprising a computer readable storage medium having program instructions embodied therewith, the program instructions executable by a processor to cause the electronic device to: obtain local position data of the mobile device within a venue; determine a first position of a mobile device within the venue; initiate a path start for a path; record location information of the path; initiate a path end for the path; and define a region bounded by the path as a zone within the venue.

BRIEF DESCRIPTION OF THE DRAWINGS

Features of the disclosed embodiments will be more readily understood from the following detailed description of the various aspects of the invention taken in conjunction with the accompanying drawings.

FIG. 17 is a flowchart indicating process steps for creating a new zone according to embodiments of the present invention.

Figure 1:
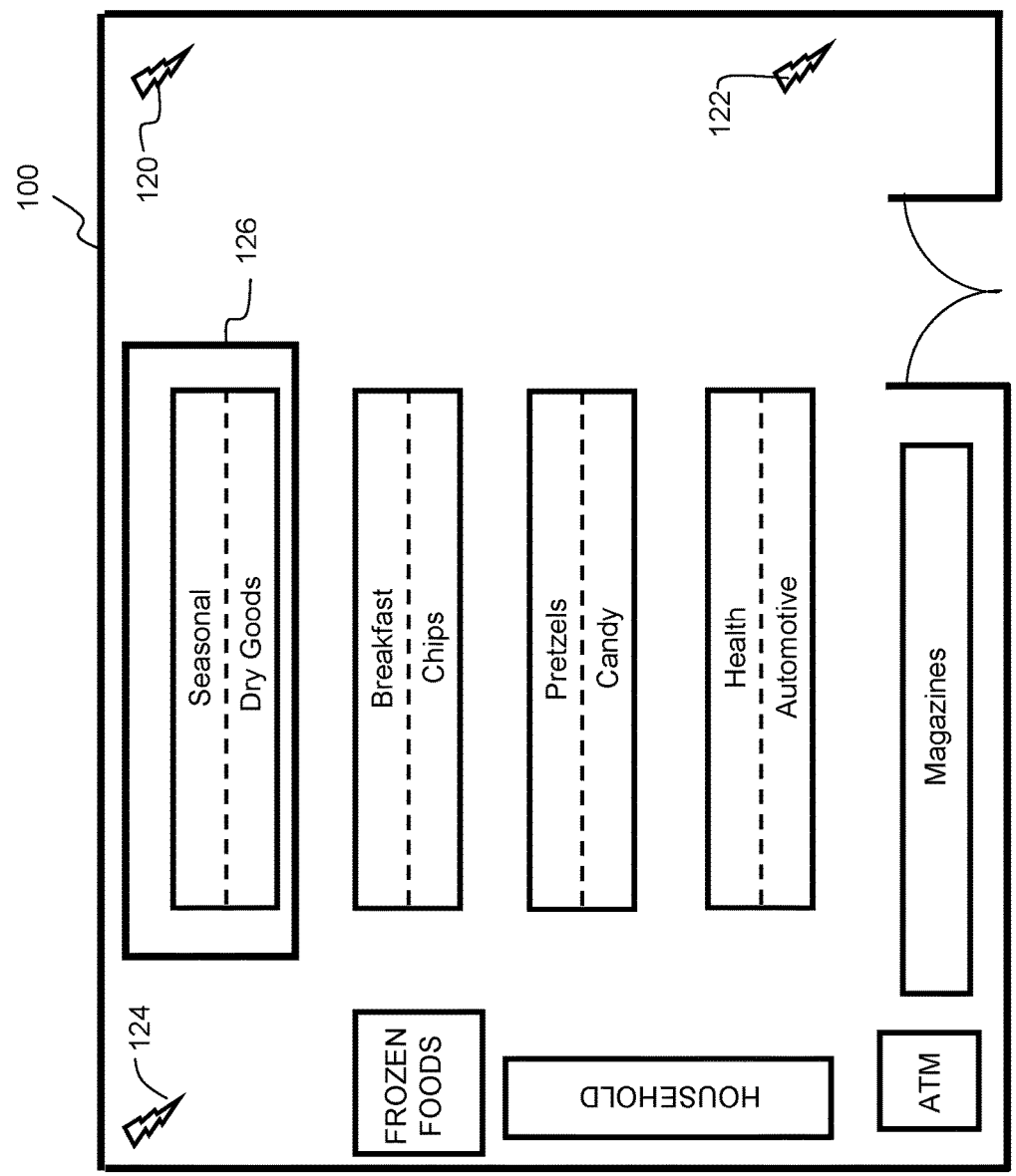
FIG. 1 is an example of a venue with a location system.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Embodiments of the present invention provide a system and method for defining zones used in location-based services. A mobile device with administrative privileges is moved in a path within a venue. The path is recorded and the interior of the path forms a zone. Thus, the region bounded by the path is established as a zone within the venue. Additionally, embodiments provide for modification of existing zones based on a recorded path from the mobile device.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 is an example of a venue 100 with a location detection system in accordance with some embodiments of the invention. In the example, the venue is a grocery store. It should be recognized that the invention is not limited to a grocery store environment. Embodiments of the invention can be implemented in any suitable store, mall, building, home, park, or other location. The location detection system utilizes beacons set up in and/or around the venue. In the example, there are three beacons, 120, 122, and 124. In embodiments, the beacons may be WiFi beacons, Bluetooth® beacons, or any other suitable beacons. Although there are three beacons shown in the example, in implementations, there may be more than three. In the venue 100, there is shown various sections of the grocery store (e.g., Seasonal, Dry Goods, Breakfast, Chips, Pretzels, Candy, Health, Automotive, Frozen Foods, Household, ATM, and Magazines). Section 126 represents a zone formed according to embodiments of the present invention. In some embodiments zones formed in accordance with embodiments of the invention may establish the perimeter and area of a geo-fence. When devices interact with the geo-fence, various actions may be initiated. These actions may include, but are not limited to, collection and reporting of statistics including time spent in a given area, and sequence in which each area of an establishment is visited.

Figure 2:
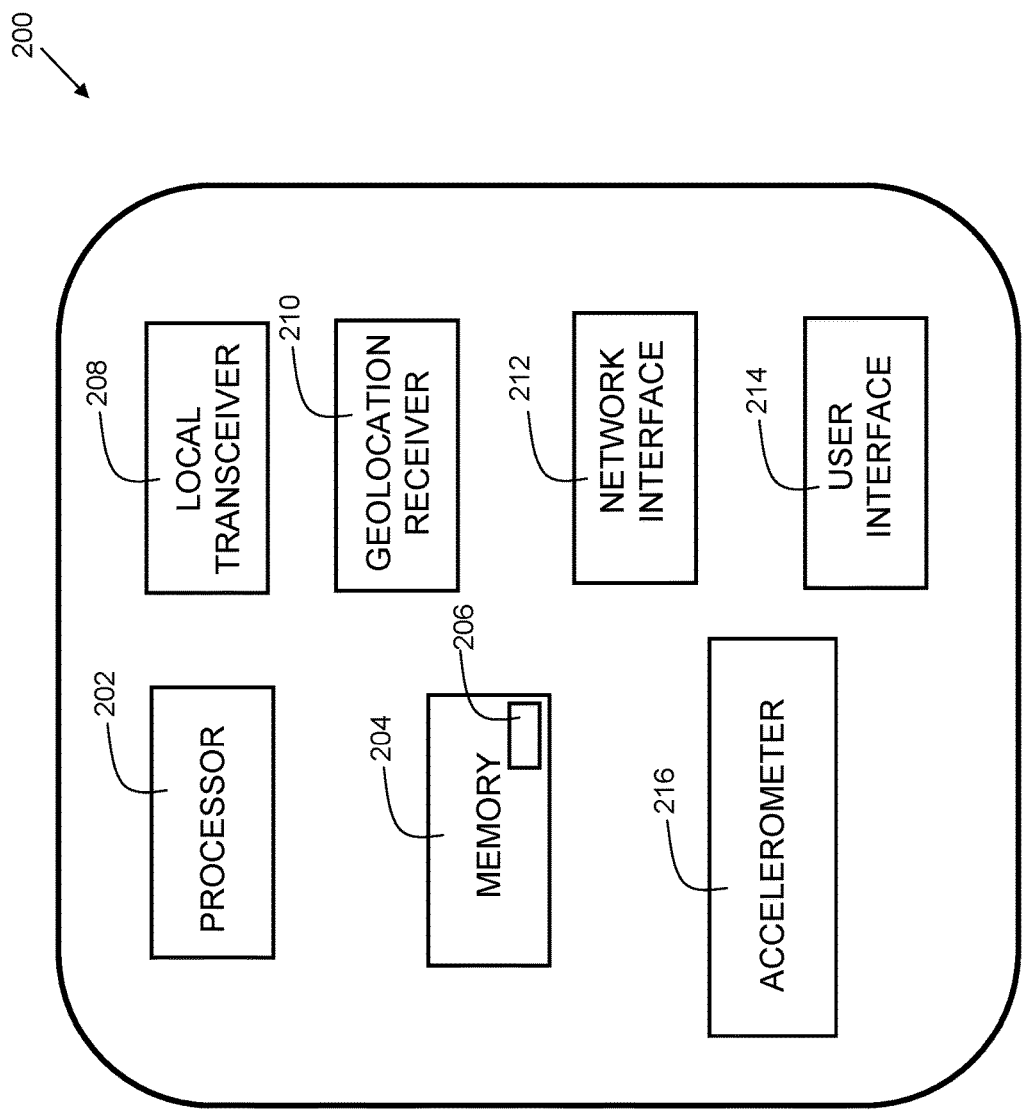
FIG. 2 is a block diagram of a device in accordance with embodiments of the present invention.

FIG. 2 is a block diagram of an exemplary electronic mobile device 200 in accordance with embodiments of the present invention. The mobile device 200 includes a processor 202, which is coupled to memory 204. Memory 204 contains an application 206, which includes instructions, that when executed by the processor 202, perform the various methods in accordance with illustrative embodiments. Although the application 206 is shown herein in the mobile device 200, in some embodiments, the application may be located on a remote data server, like 290 of FIGS. 14A and 14B. In such implementations, mobile device 200 sends positional measurements and other data over a network to the server for processing and/or storage.

Mobile device 200 may further include a local transceiver 208. The local transceiver 208 includes a transmitter and receiver for local radio frequency (RF) signals. In embodiments, the local transceiver may include a WiFi transceiver, Bluetooth® transceiver, Zigbee transceiver, or other near field communication (NFC) transceiver. Mobile device 200 further may include a geolocation receiver 210. The geolocation receiver 210 may be configured to receive signals from multiple satellites to triangulate a position on Earth. In embodiments, the geolocation receiver 210 may include a Global Positioning System (GPS) receiver, GLONASS receiver, Galileo receiver, or other satellite based positioning system.

Mobile device 200 may further include a user interface 214. User interface 214 may include a touch screen and provides a user with the ability to enter information as necessary to establish settings to determine operation in accordance with embodiments of the present invention.

The mobile device 200 further includes a network interface 212. Network interface 212 may include a cellular network interface, a WiFi interface, such as an IEEE 802.11 interface, or other suitable network interface.

In some embodiments, mobile device 200 may be a smart phone, tablet computer, smart watch, or other mobile device now known of hereafter developed. The mobile device, using the local transceiver 208 has the capability to detect a path on which it is moved, and in some embodiments, calculate the coordinates of a desired zone or edited to a zone, based on the path, and store the resulting information in memory 204. Additionally, in some embodiments, the geolocation receiver 210 may receive location information from satellites. The geolocation receiver 210 may be used in outdoor venues. Additionally, the path information may be supplemented by an accelerometer 216 as part of an inertial navigation process. Thus, in cases where the functionality of the local transceiver 208 and/or geolocation receiver 210 is unavailable (e.g., due to lack of reception), the inertial navigation process may provide location and path information. The device may further include additional storage such as a magnetic hard disk, flash memory, or other suitable storage device for storing the information.

Figure 3:
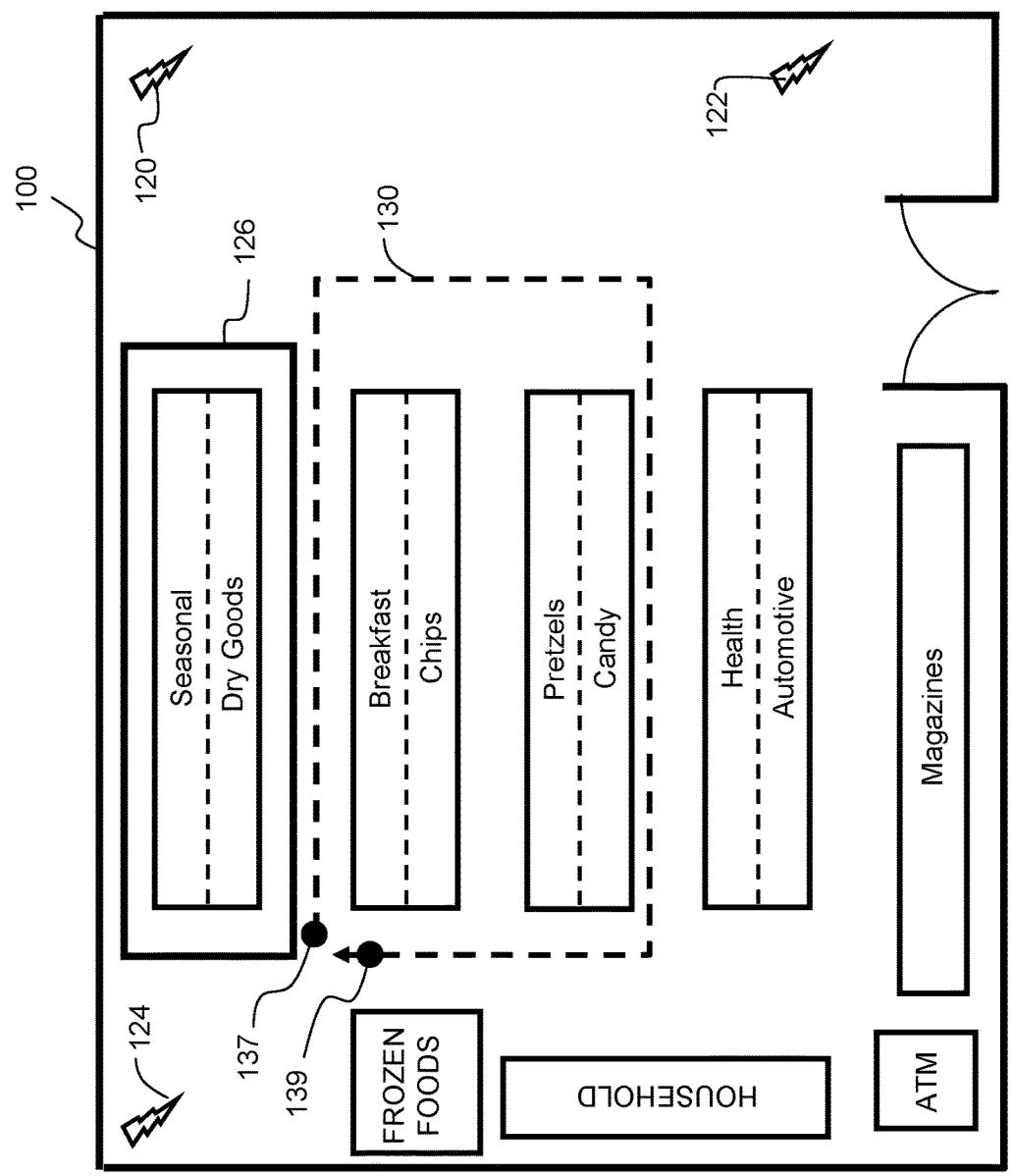
FIG. 3 illustrates an example of zone creation.

FIG. 3 illustrates an example of zone creation in accordance with embodiments of the invention. In implementations, a user possessing mobile device 200 sets an application 206, containing instructions to execute elements of embodiments of the invention, into administrative mode. The mobile device 200 records a first position 137, and the user initiates, in the application 206, a path start for a path, then moves the mobile device along the path in venue 100 to a second position 139. In embodiments, the first position 137 may be substantially identical to the second position 139. In some embodiments, when the first position and second position are within, for example, one yard of each other, they are deemed "identical" for the purposes of zone creation/modification. The user may walk, run, bicycle, use a wheelchair or motorized scooter, etc., to move about the venue 100. Beacons 120, 122, and 124 triangulate location to determine the path on which the user is moving the mobile device 200. In this example, the application 206 is set such that once the mobile device 200 detects that a closed path has been created, a path end is initiated by the application, and that closed path becomes saved as a zone. In other embodiments, a user can initiate a path end through user input, for example, if he/she makes a mistake in the path or wishes to use a synthesized line as described hereinbelow. In the example here, a user moved the mobile device 200 substantially along a path including the four lines making up zone 130. It should be recognized that a user will not necessarily walk in a perfect shape, such as a rectangle. In some embodiments, the application 206 can correct the lines to make a best-fit line or shape. In some embodiments, a user can specify which shape he/she wishes to create (e.g., a square, rectangle, circle, oval, etc. Embodiments of the invention can then create such a shape from the triangulated coordinates.

Figure 4:
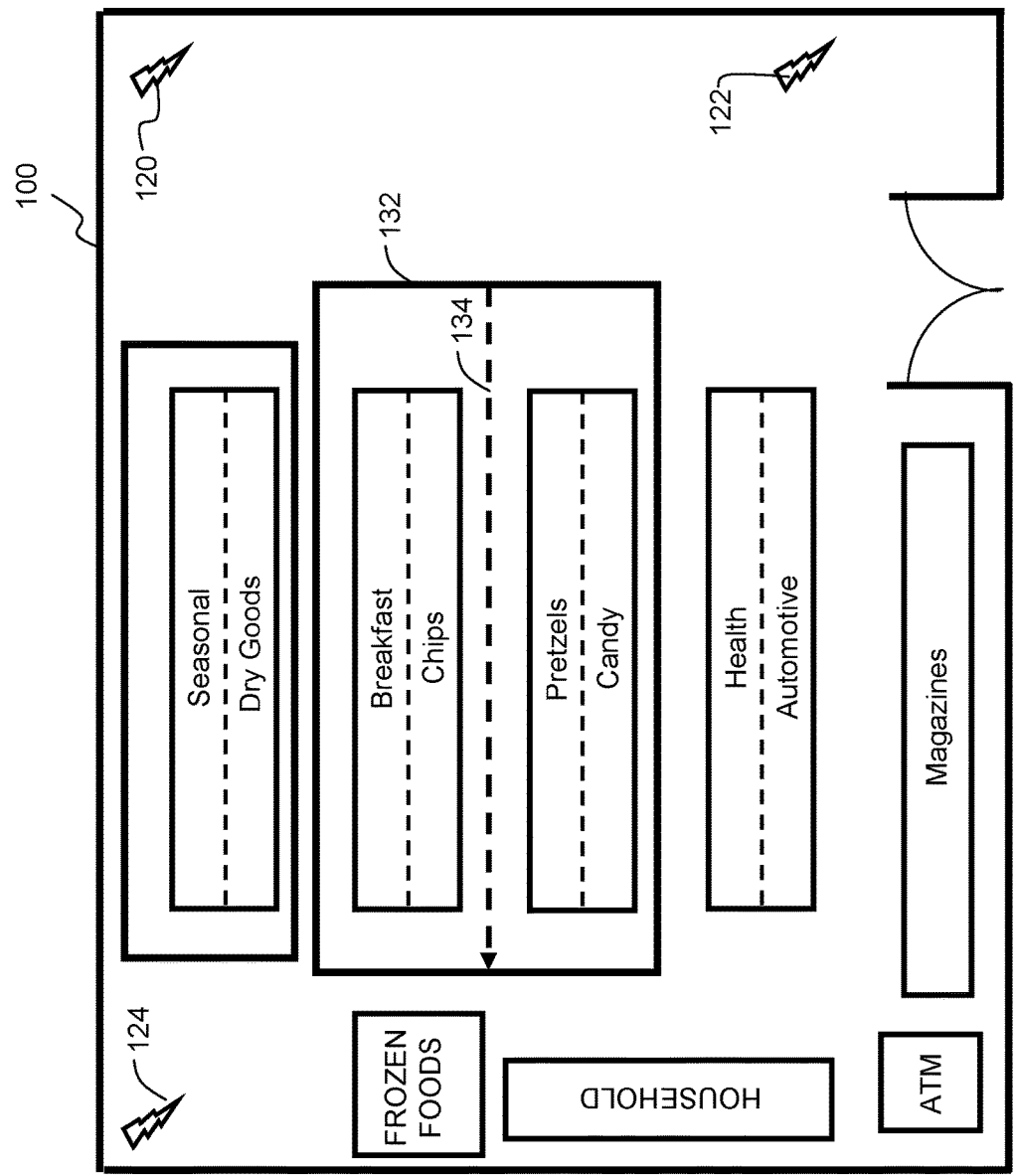
FIG. 4 illustrates an example of zone splitting.

FIG. 4 illustrates an example of zone splitting in accordance with embodiments of the invention. In some implementations, a zone can be modified or edited. In embodiments, the mobile device may receive an indication that a user has selected an "edit" option, or the like. In the example, the application 206 receives an indication that the user further selects a "split" option (or sub-option of the "edit" option). The user then moves the device substantially along a path within an existing zone where he/she desires the zone to be split. In the example, the user walks substantially along path 134 in zone 132. Beacons 120, 122, and 124 triangulate to identify a location. The mobile device 200 tracks the change in location, which forms the path. The application 206 on mobile device 200 detects the path. In embodiments, the user may select a zone for splitting, and then walk along a path 134 to split the zone into two new zones. The information is then saved and/or transmitted to a data server.

Figure 5:
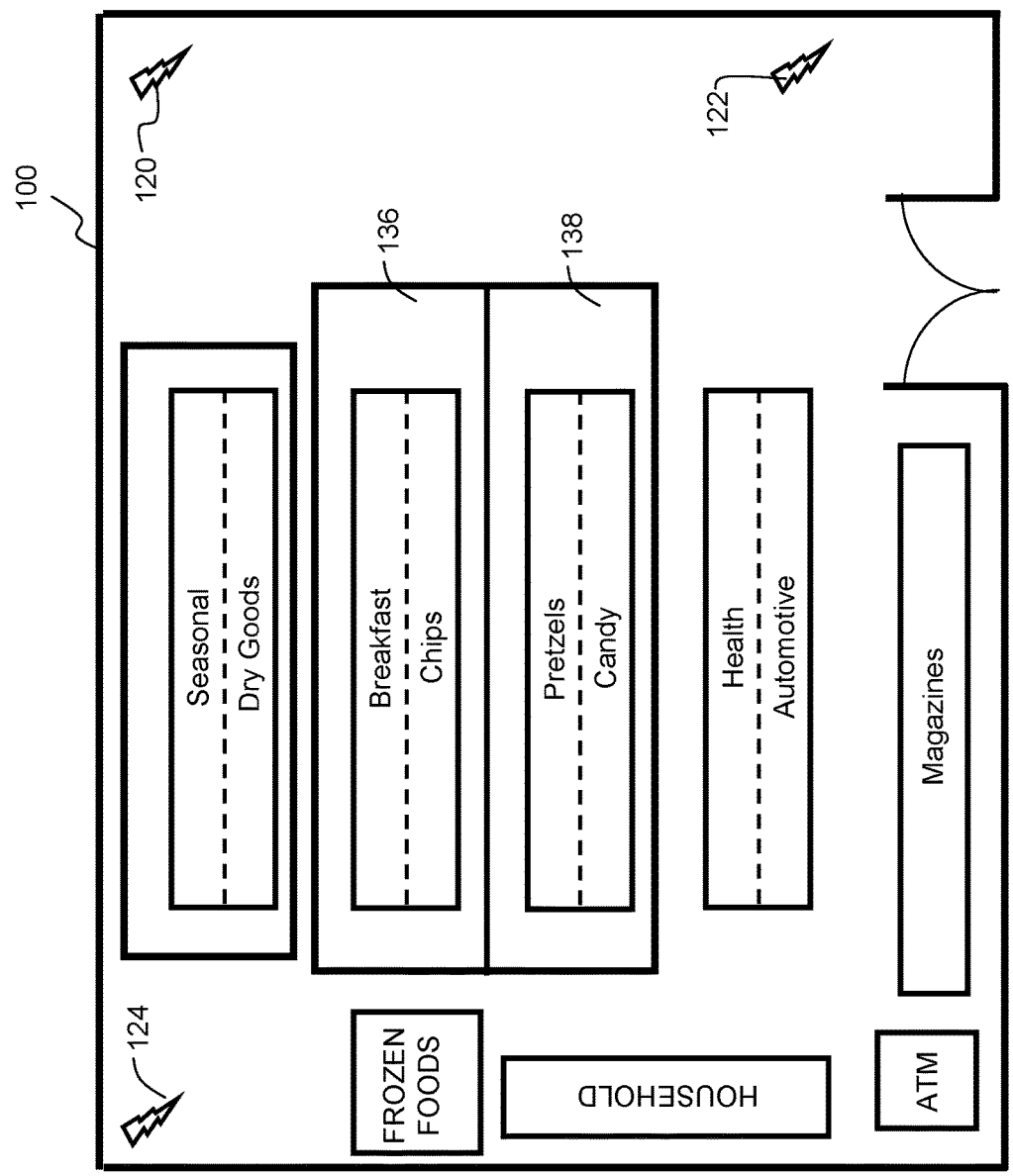
FIG. 5 illustrates an example of a zone split into two zones.

FIG. 5 illustrates an example of a zone split into two zones. As shown, the section that was previously single zone 132 in FIG. 4 now is two zones 136 and 138, split along line 134 of FIG. 4. Zone 136 includes Breakfast and Chips aisles, while Zone 138 includes the Pretzels and Candy aisles.

Figure 6:
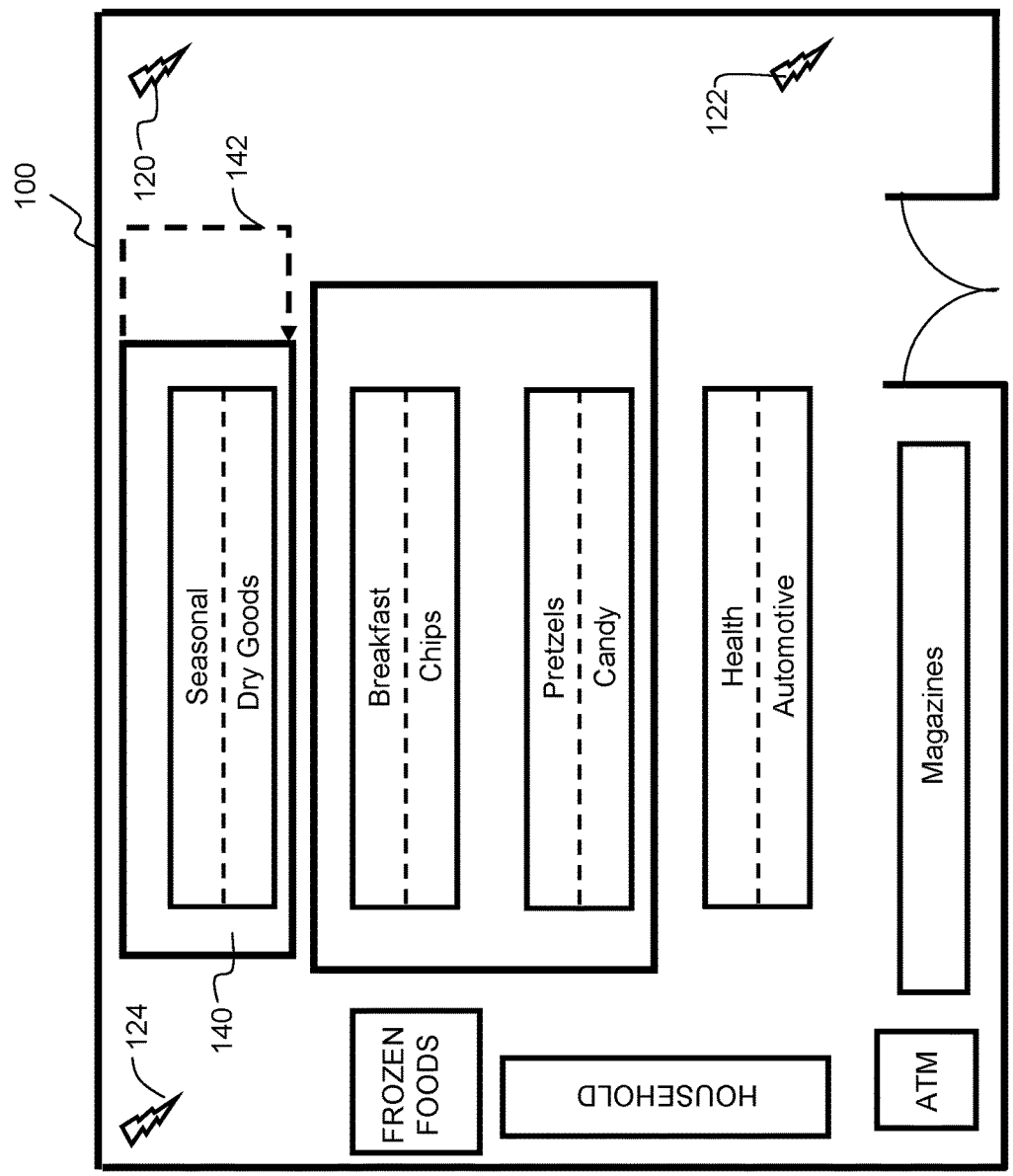
FIG. 6 illustrates an example of zone expansion.

FIG. 6 illustrates an example of zone expansion. In embodiments, the mobile device may receive an indication that a user has selected an "edit" option, or the like. In the example, the application 206 receives an indication that the user further selects an "expand" option (or sub-option of the "edit" option). The user then moves the device substantially along a line/path outlining the space he or she wishes to expand a previously created zone to include. In the example, the user walks along path 142. Beacons 120, 122, and 124 triangulate to identify a location. The mobile device 200 tracks the change in location, which forms the path. Application 206 on mobile device 200 detects the path. In embodiments, the user may select a zone for expansion, and then walk along a path 142 to expand the zone. The information is then saved and/or transmitted to a data server.

Figure 7:
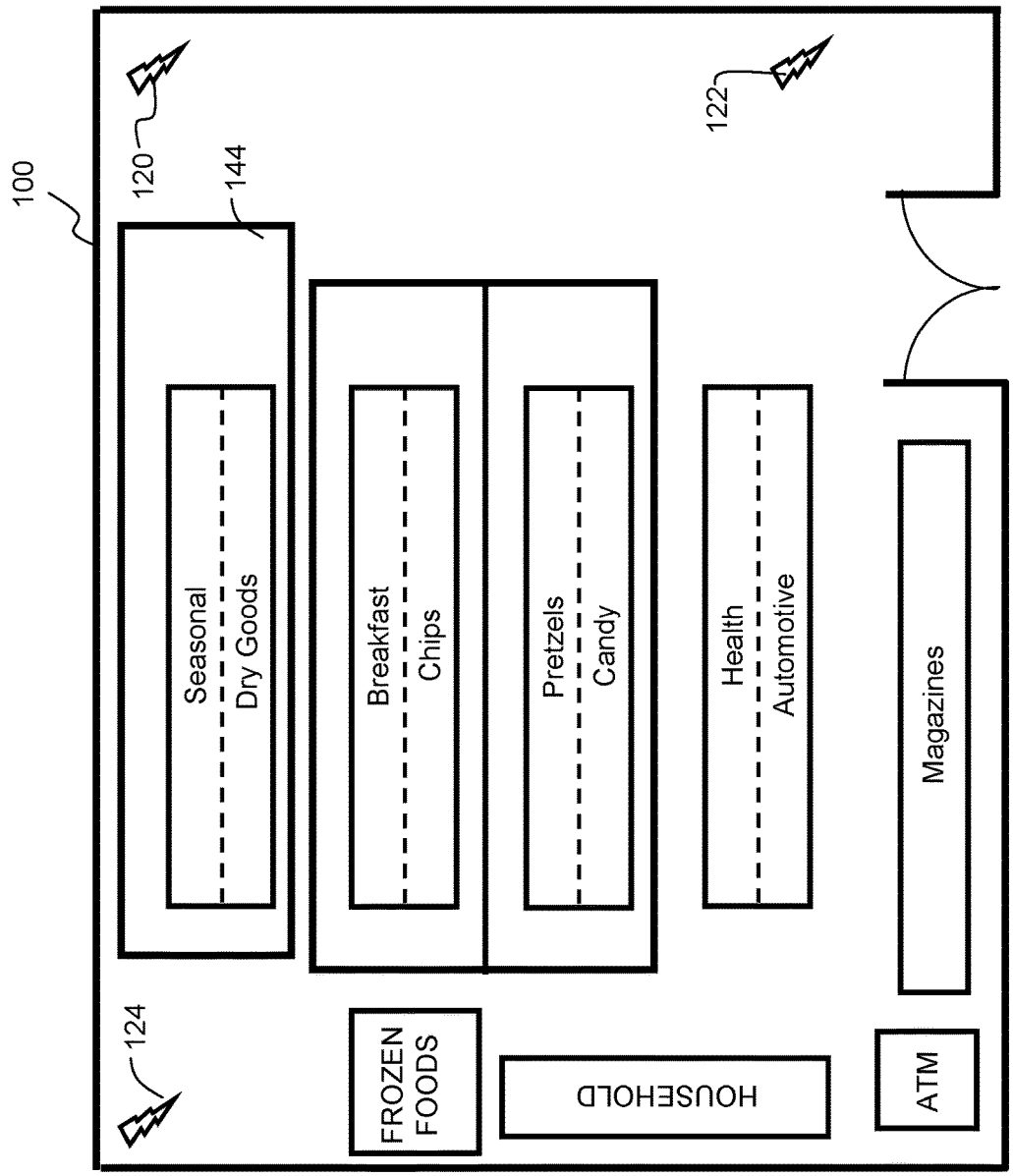
FIG. 7 illustrates an example of an expanded zone.

FIG. 7 illustrates an example of an expanded zone. The expanded zone, zone 144, has replaced original zone 140. The zone was expanded by the surface area delineated by the user walking the mobile device 200 around path 142 of FIG. 6. In some embodiments, a zone valid period for the expanded zone 144 may be established. After the valid period elapses, the zone is reverted to a previous boundary, such as that indicated by zone 140 of FIG. 7. An example scenario for such an embodiment is for seasonal items. For example, in the spring, a zone may be expanded to accommodate grills and picnic tables with a valid period of 120 days. Then, after the 120 days elapses, the zone may revert back to its previous size, as the grills and picnic tables are no longer present in the retail space once they are out of season.

Figure 8:
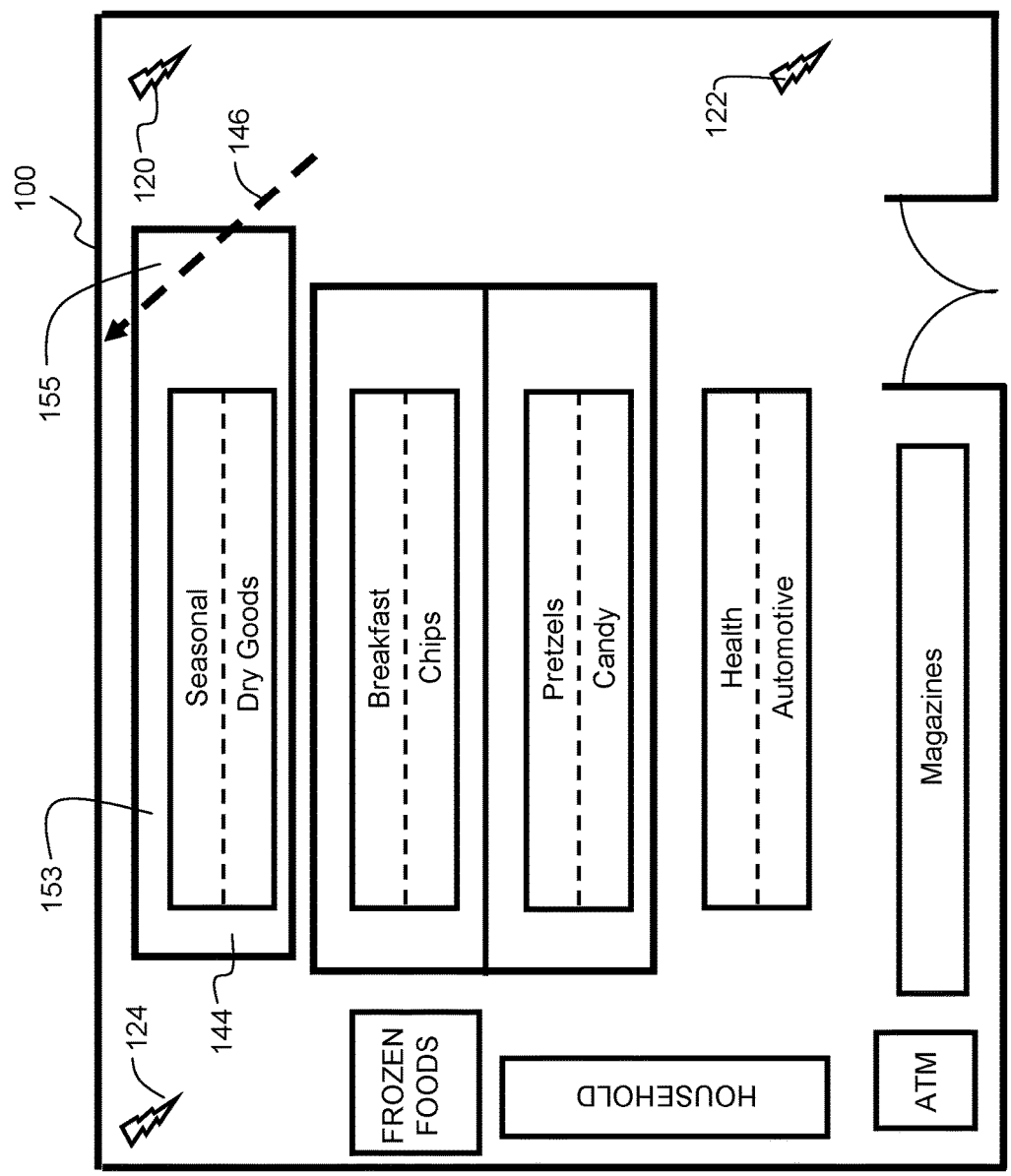
FIG. 8 illustrates an example of zone contraction.

FIG. 8 illustrates an example of zone contraction. In embodiments, the application 206 may receive user input selecting an "edit" option, or the like. In the example, the mobile device 200 receives an indication that the user further selects a "contract" option (or sub-option of the "edit" option). The user then moves the device substantially along a path to delineate space desired to be contracted or cut from a previously created zone. In the example, the user walks along path 146 in zone 144. Beacons 120, 122, and 124 triangulate to identify a location. The mobile device 200 tracks the change in location, which forms the path. Application 206 detects the path. In embodiments, the user may select a zone for contraction, and then walk along a path 146 to contract the zone. In embodiments, the application 206 determines the smaller of the two sections formed by path 146. In this example, the path 146 forms section 153 and section 155. Section 155 is smaller than section 153, and thus is removed, leaving section 153 as the newly sized contracted zone. In other embodiments, the user may be given an option to select which section is to be deleted. The information is then saved and/or transmitted to a data server.

Figure 9:
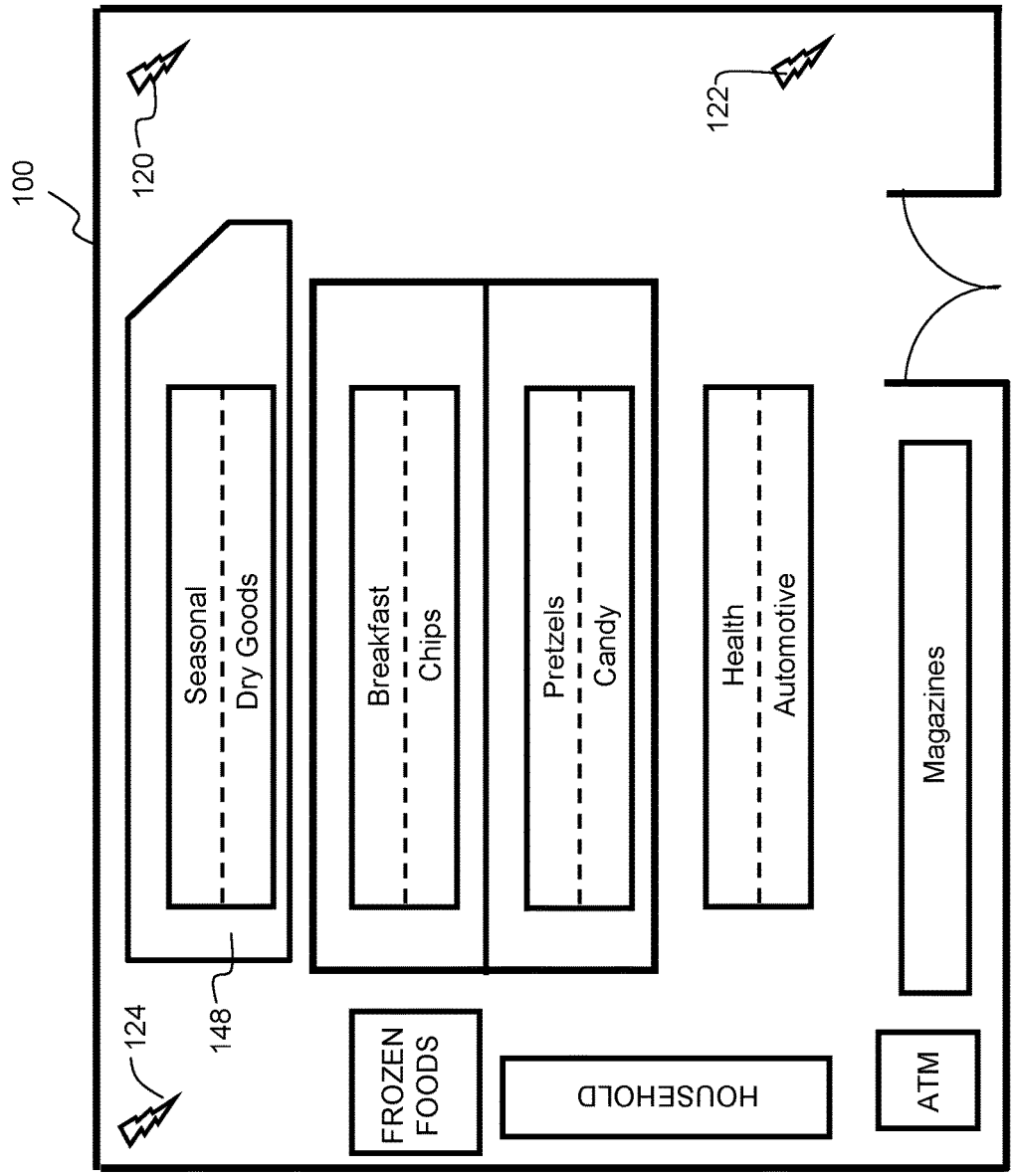
FIG. 9 illustrates an example of a contracted zone.

FIG. 9 illustrates an example of a contracted zone. The contracted zone, zone 148, has replaced original zone 144 of FIG. 8. The zone was contracted, or cut, by the amount and location of space delineated by the user walking the mobile device 200 along path 146 of FIG. 8.

Figure 10:
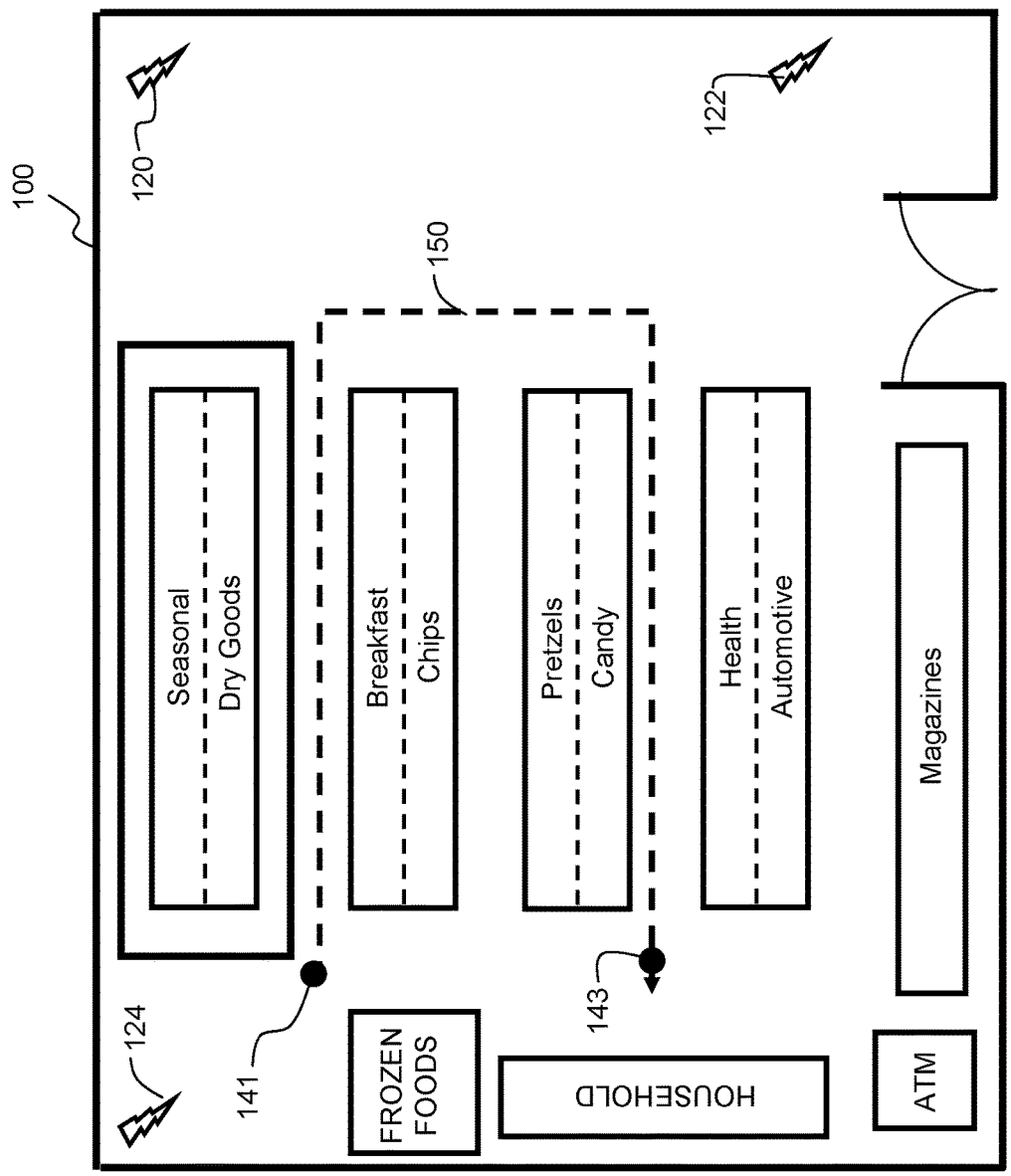
FIG. 10 illustrates an example of an open-shaped path.

FIG. 10 illustrates an example of an open-shaped path. In some embodiments, the application 206 can close an open-shaped path without the user having to walk the entire path. In embodiments, the user moves the device substantially along a path where it is desired that the zone be created. In the example here, the user travels from a first position 141 along path 150 to a second position 143. In this embodiment, the first position 141 is different from the second position 143, and path 150 has three walls, forming an open shape. Beacons 120, 122, and 124 triangulate to identify a location. The mobile device 200 tracks the change in location, which forms the path. Application 206 detects the path. In embodiments, the user may select an option for creation of a new zone, and then walk along a path 150 to create an open shape that is to be converted to a closed shape by formation of the synthesized line segment, thus forming a zone. The information is then saved and/or transmitted to a data server.

Figure 11:
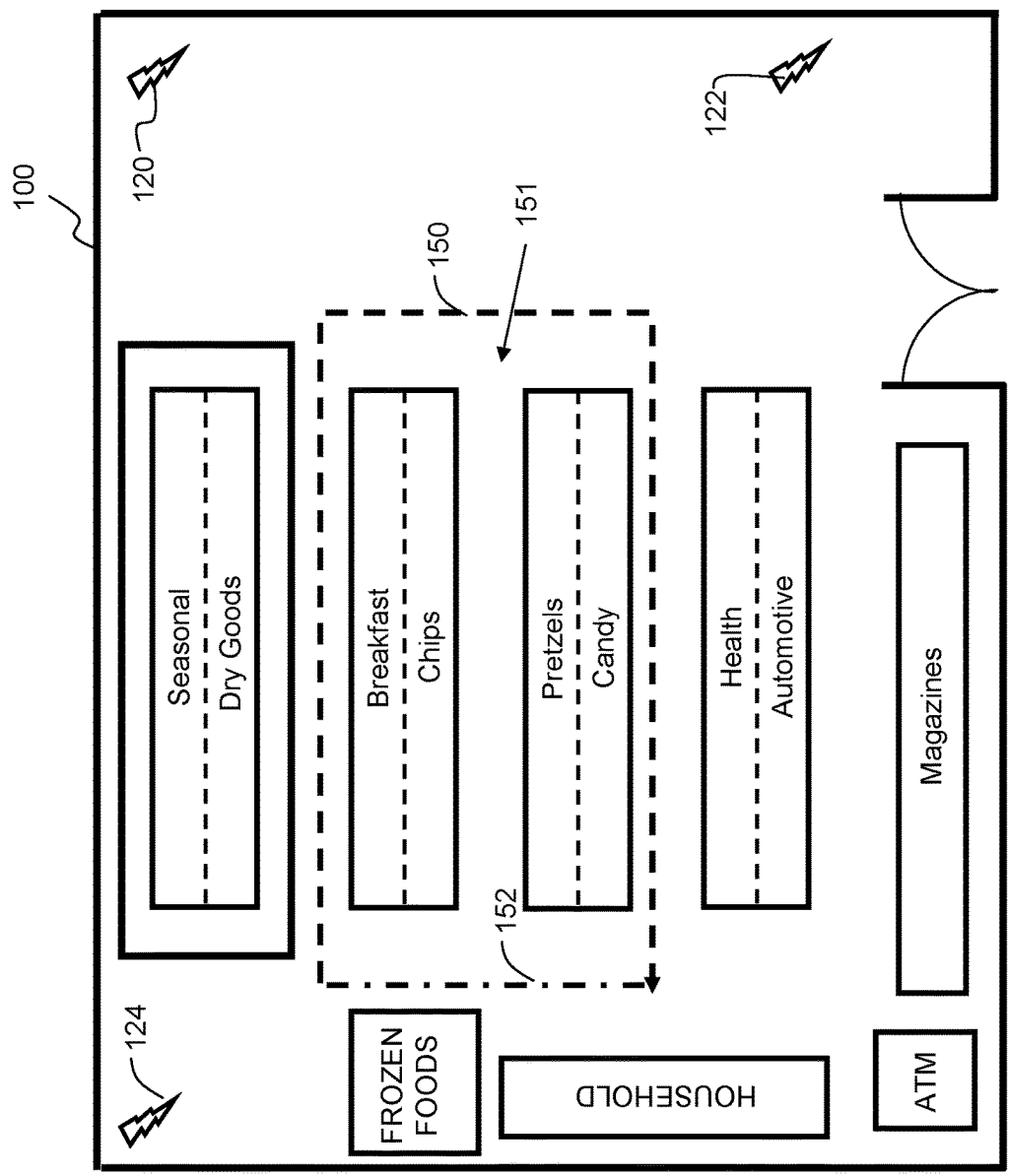
FIG. 11 illustrates an example of a synthesized line segment to form a closed path.

FIG. 11 illustrates an example of a synthesized line segment to form a closed path. In some embodiments, it is determined that the user has selected an option to close an open shape of the path. A line 152 is then synthesized to close the line 150 to form a closed shape, i.e., zone 151. Thus, the user does not need to travel along line 152 to create the zone. The zone is completed based on the user's travel along path 150, thus reducing the time and effort needed to create a zone.

Figure 12:
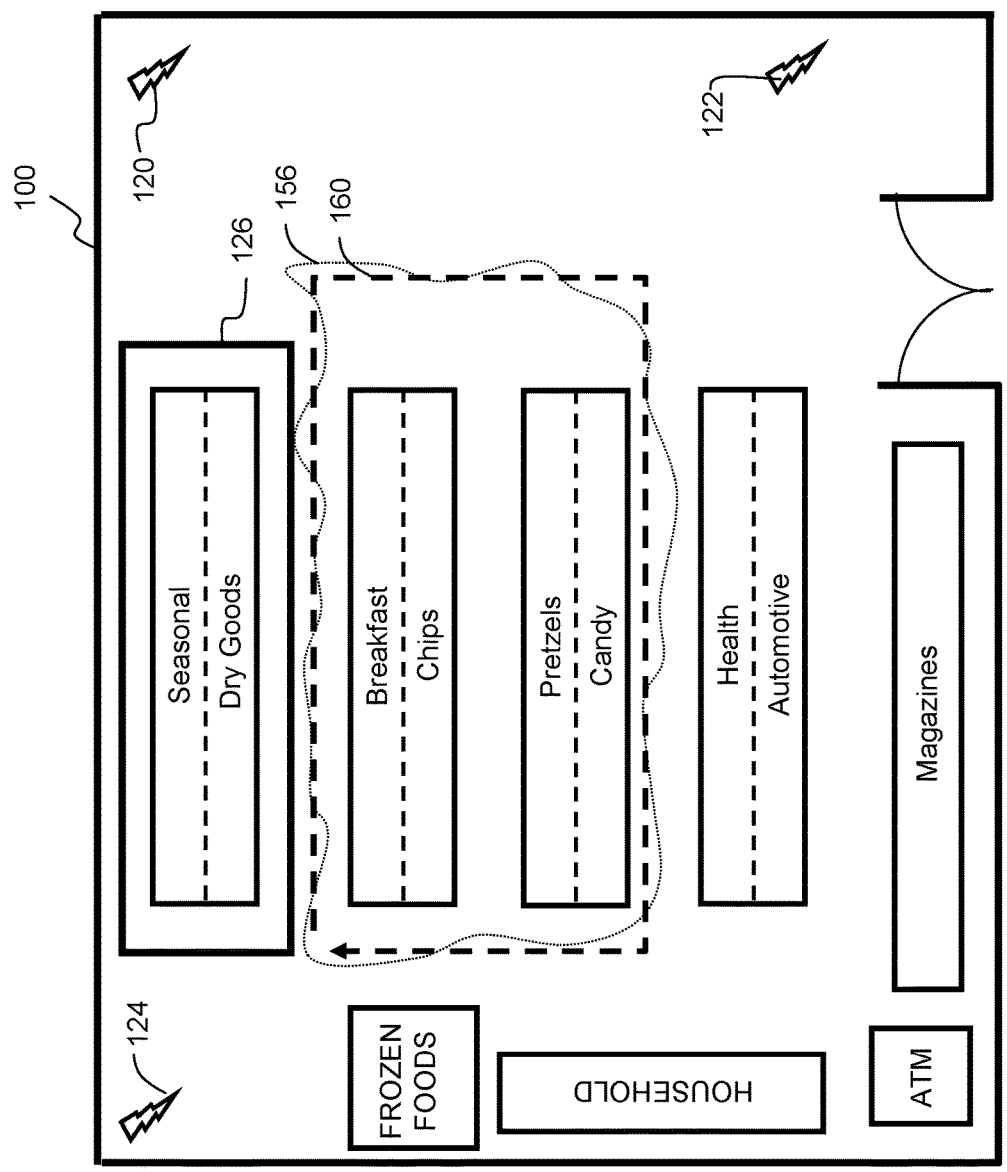
FIG. 12 illustrates an example of a zone having a rectangular shape.

FIG. 12 illustrates an example of a zone having a rectangular shape. In embodiments, a user walked path 156. The user selected an option to shape the path as "rectangle." Accordingly, the system performs an analysis to create a rectangular zone 160 which is a "best fit" over the path.

Figure 13:
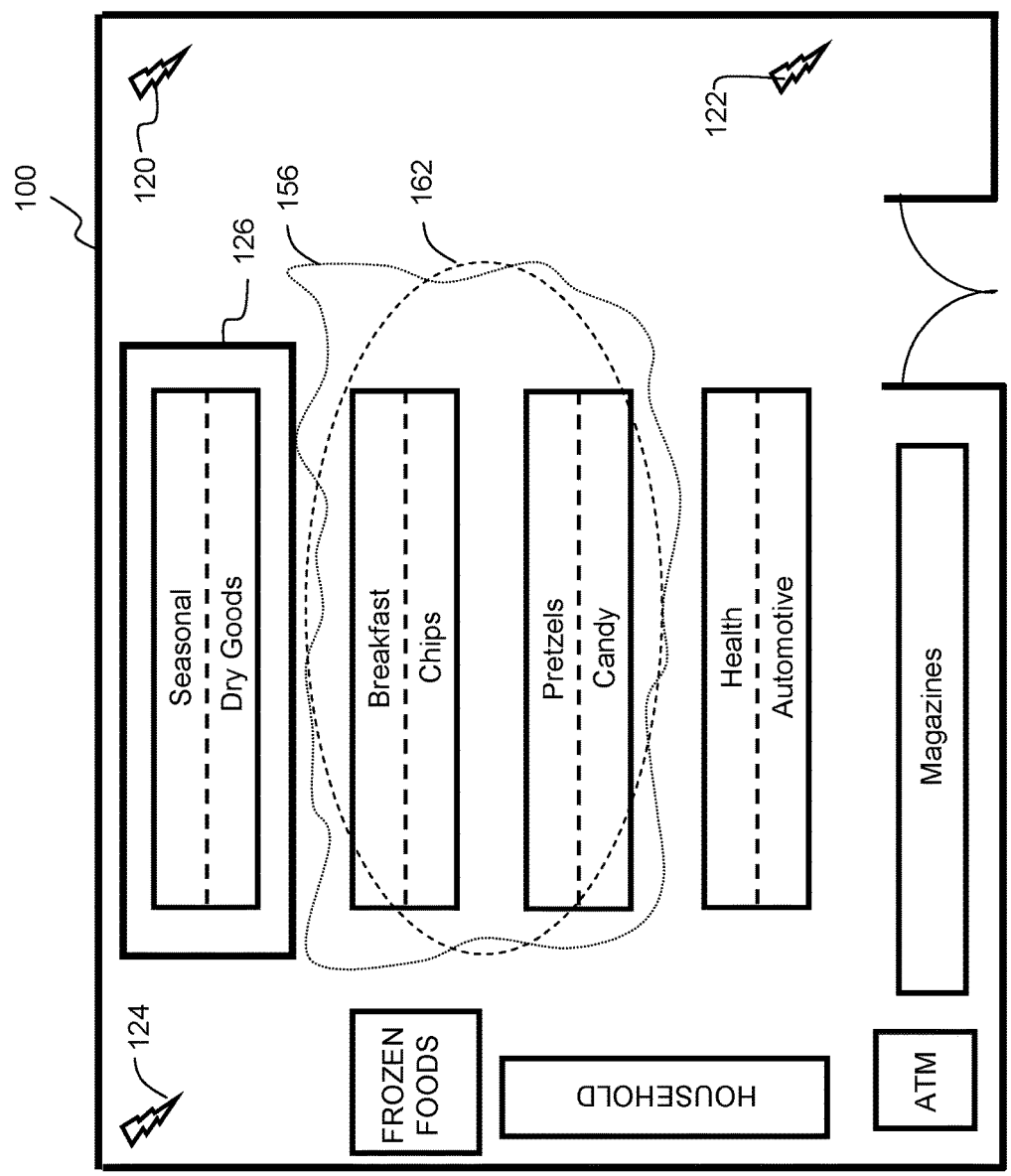
FIG. 13 illustrates an example of a zone re-shaped to be ovular.

FIG. 13 illustrates an example of the zone of FIG. 12, where a re-shape has been executed to make the zone ovular. In some embodiments, the system may reshape a zone in response to selection of an option by a user. In the example, the zone 160 of FIG. 12 is re-shaped as an ovular zone 162.

Figure 14A:
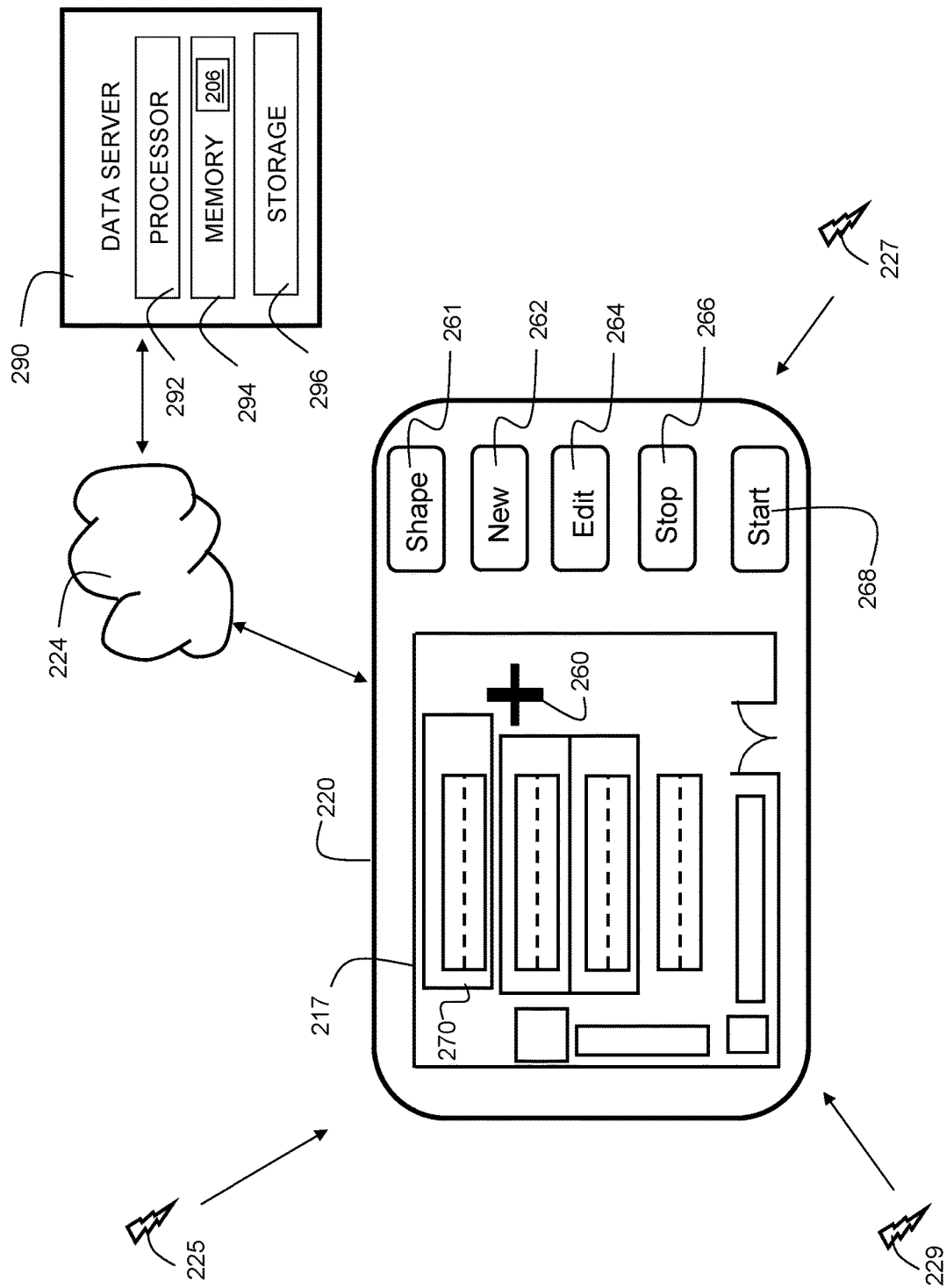
FIG. 14A illustrates a block diagram of a system in accordance with embodiments of the present invention.

FIG. 14A illustrates a block diagram of a system in accordance with embodiments of the present invention. Mobile device 220 (e.g., a smartphone, a tablet, etc.), includes user interface 217. In some embodiments, initially, the user interface is divided into multiple sections. User interface 217 includes a display including a map of the venue. In some embodiments, an admin user uploads the map into an application executing embodiments of the invention. Box 270 represents an example zone that was previously created. Indicator 260 represents the current location of the device, e.g., a "You Are Here" indication to the user. The user interface 217 also includes one or more options for selection. In the example here, the options are "buttons" including, New 262, Edit 264, Stop 266, and Start 268. Selection, for example, clicking using a mouse or pressing on a touch screen, of button 262 indicates that a user wishes to form a new zone. Selection of button 264 indicates that a user wishes to edit an existing zone. Selection of button 264 may cause a pop-up window to open on the screen, or other interface.

Figure 14B:
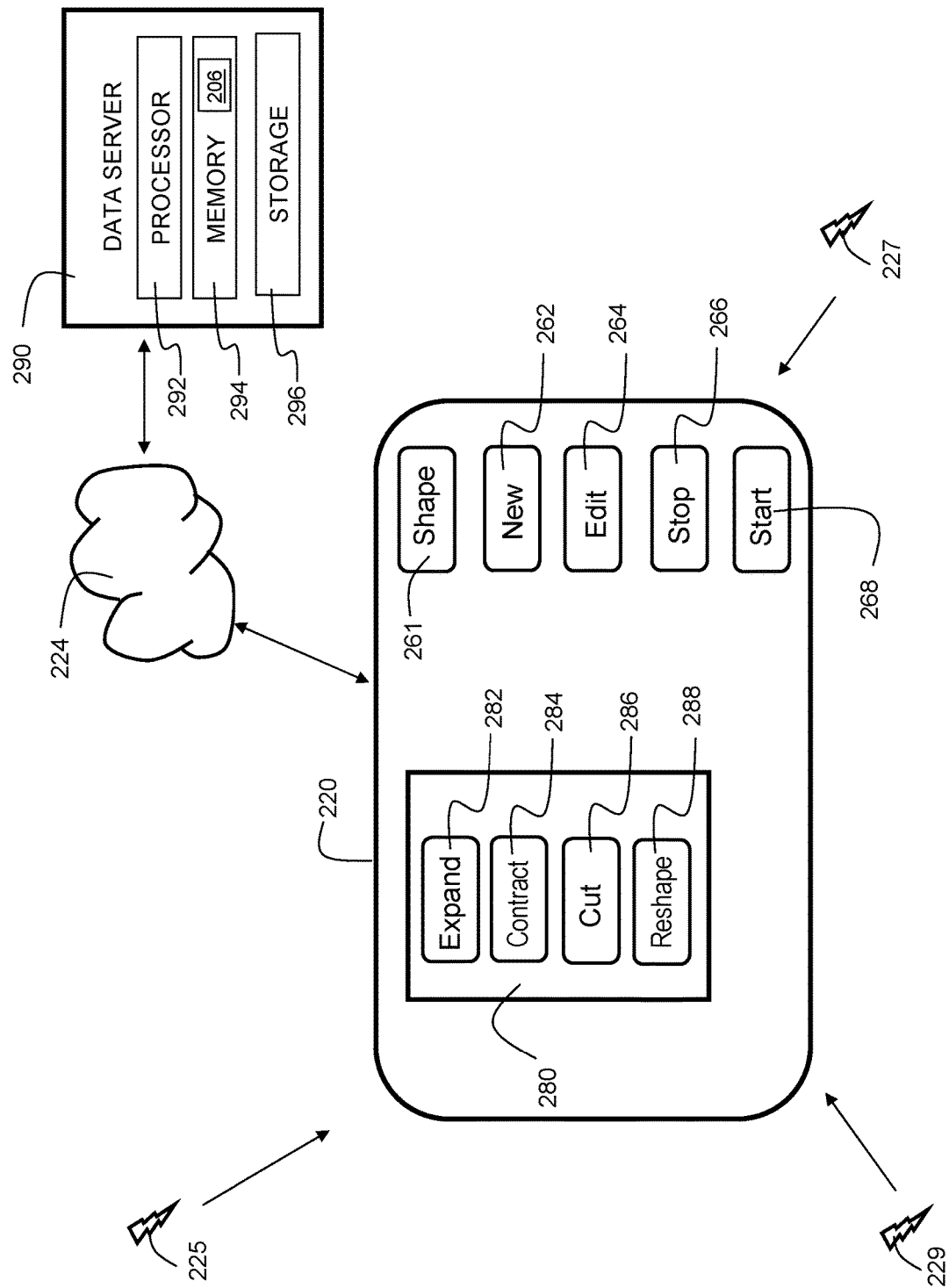
FIG. 14B illustrates a pop-up screen on a user interface in accordance with embodiments of the invention.

FIG. 14B illustrates a pop-up screen on a user interface in accordance with embodiments of the invention. The pop-up screen 280 may display sub-option buttons from which the user can select, such as Expand 282, Contract 284, Cut 286, Reshape 288, etc. Selection of button 268 causes the application to begin monitoring the path on which the mobile device is moved (e.g., by the user). Selection of button 266 causes the application to stop monitoring the movement of the device and signifies completion of a path, and initiating the process of creating/editing a zone based on the path. The configuration of the user interface shown herein is an example. In embodiments, the configuration may be different. For example, the sections could be replaced differently and/or include different, more, or fewer features from those shown herein. A further example is that the buttons could be replaced with other mechanisms, like radio buttons, scroll lists, etc.

Mobile device 220 is connected via a network 224 to data server 290. Data server 290 includes a processor 292, memory 294, and storage 296. Storage can be RAM, ROM, flash, etc. As shown, in some embodiments, the application may be located on data server 290, and receive data from the mobile device for processing and/or storage. Network 224 can be any suitable network, including but not limited to, the Internet, a wide-area network, a local area network, a cloud computing network, etc. Additionally, mobile device 220 is in communication with three beacons, 225, 227, and 229 for the purpose of location determination. The data server 290 may receive data from the mobile device for processing. Alternatively, or in addition to, the data server may receive processed data from the mobile device for storage.

The application 206 may be described in the general context of computer-executable instructions, such as program modules, being executed by a computer. Generally, program modules include routines, programs, components, logic, data structures, and so on, which perform particular tasks or implement particular abstract data types. Disclosed embodiments may be practiced in distributed computing environments where tasks are performed by remote processing devices that are linked through a communications network. In a distributed computing environment, program modules may be located in both local and remote computer storage media including memory storage devices.

Figure 15:
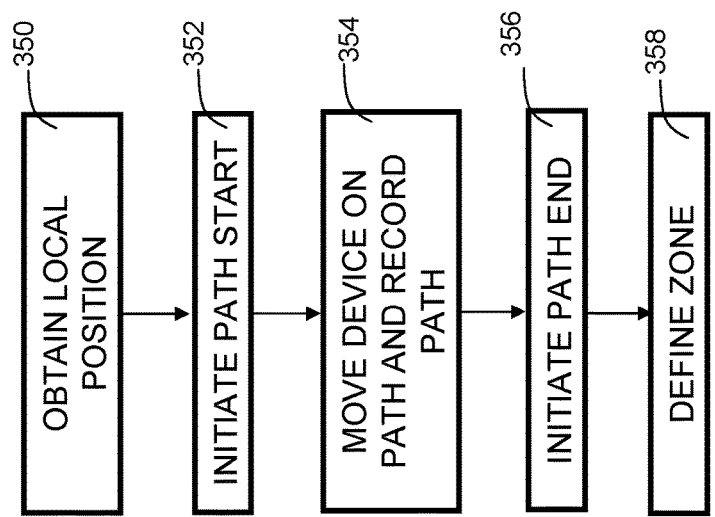
FIG. 15 is a flowchart indicating process steps for an embodiment of the present invention.

FIG. 15 is a flowchart indicating process steps for creating a new zone according to embodiments of the present invention. At 350, a local position is obtained. At 352, a path start is initiated in response to receipt of a command. At 354, a path on which the mobile device is moved is detected and recorded. At 356, a path end is initiated in response to receipt of a command. At 358, the zone is defined.

Figure 16:
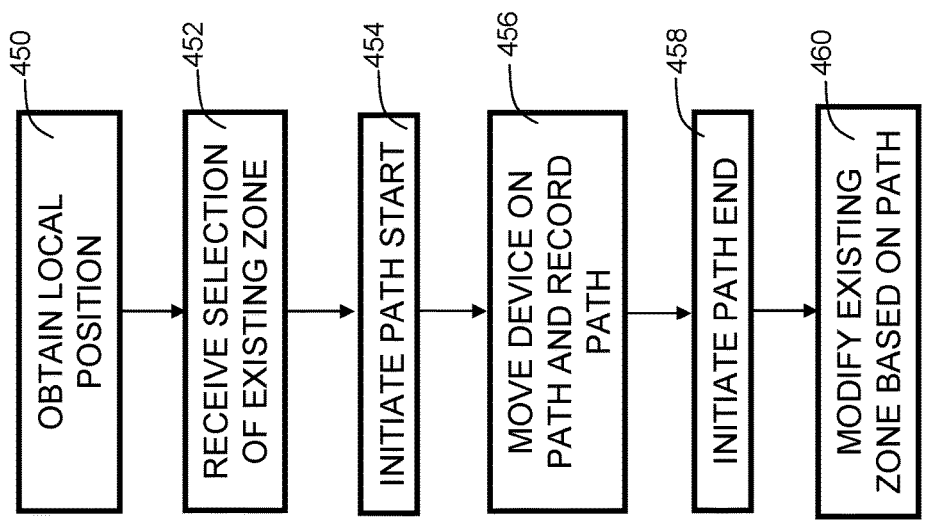
FIG. 16 is a flowchart indicating process steps for an alternative embodiment of the present invention.

FIG. 16 is a flowchart indicating process steps for an alternative embodiment of the present invention, modifying an existing zone. At 450, a local position is obtained. At 452, a selection of an existing zone is received. At 454, a path start is initiated in response to receipt of a command. At 456, a path on which the device is moved is detected and recorded. At 458, a path end is initiated in response to receipt of a command. At 460, the selected existing zone is modified based on the path.

FIG. 17 is a flowchart indicating process steps for creating a new zone according to embodiments of the present invention. At 550, a local position is obtained. At 552, a path start is initiated in response to receipt of a command. At 554, a path on which the mobile device is moved is detected and recorded. At 556, a path end is initiated in response to receipt of a command. At 558, a desired zone shape is received. At 560, the zone is created and defined based on the path and the selected shape.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

Embodiments of the present invention may also include a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for defining zones within a location detection system at a venue, comprising:
    obtaining local position data of a mobile device within the venue;
    determining a first position of the mobile device within the venue;
    initiating a path start for a first path based on user input through a screen of the mobile device, wherein the path start is a location corresponding to the first position of the mobile device;
    after the path start is initiated, tracking locations of the mobile device as it is moved along the first path from the first position to a second position, while recording location information of the path;
    after the moving of the mobile device, initiating a path end for the first path based on user input through a screen of the mobile device;
    defining a region bounded by the tracked locations of the mobile device along the first path as a first zone within the location detection system at the venue;
    receiving, from a user, a selection of the first zone and a split option;
    tracking locations of the mobile device, as the user moves the mobile device along a second path within the first zone; and
    splitting the first zone into a second zone and a third zone separated from one another by lines corresponding to the second path.

2. The method of claim 1, further comprising transmitting location information of the first path and the second path to a data server.

3. The method of claim 1, wherein the second position is substantially identical to the first position, whereby the first path forms a closed shape.

4. The method of claim 1, wherein the second position is different from the first position, whereby the first path forms an open shape.

5. The method of claim 4, wherein initiating a path end further comprises synthesizing a line segment between the first position and the second position to form a closed shape that defines the first zone.

6. The method of claim 1, further comprising presenting a representation of the first zone on the screen of the mobile device.

7. The method of claim 1, further comprising receiving a zone shape for the first zone from the user.

8. A mobile device comprising:
    a processor;
    a memory coupled to the processor;
    a network interface coupled to the processor;
    a local receiver coupled to the processor; wherein the memory contains instructions, which when executed by the processor, perform the steps of:
        obtaining local position data of a mobile device within a venue;
        determining a first position of the mobile device within the venue;
        initiating a path start for a first path based on user input through a screen of the mobile device, wherein the path start is a location corresponding to the first position of the mobile device;
        after the path start is initiated, tracking locations of the mobile device as it is moved along the first path from the first position to a second position, while recording location information of the path;
        after the moving of the mobile device, initiating a path end for the first path based on user input through a screen of the mobile device;
        defining a region bounded by the tracked locations of the mobile device along the first path as a first zone within the location detection system at the venue;
        receiving, from a user, a selection of the first zone and a split option;
        tracking locations of the mobile device, as the user moves the mobile device along a second path within the first zone; and
        splitting the first zone into a second zone and a third zone separated from one another by lines corresponding to the second path.

9. The mobile device of claim 8, further comprising a WiFi transceiver.

10. The mobile device of claim 8, further comprising a Bluetooth transceiver.

11. The mobile device of claim 8, wherein the memory further contains instructions, which when executed by the processor, perform the step of synthesizing a line segment between the first position and the second position to form a closed shape that defines the first zone.

12. The mobile device of claim 8, wherein the memory further contains instructions, which when executed by the processor, perform the step of presenting a representation of the first zone on the screen of the mobile device.

13. The mobile device of claim 8, wherein the memory further contains instructions, which when executed by the processor, perform the step of receiving a zone shape for the first zone from the user.

14. A computer program product for adjustment of an electronic display of an electronic device, comprising a computer readable storage medium having program instructions embodied therewith, the program instructions executable by a processor to cause the electronic device to:
    obtain local position data of a mobile device within a venue;
    determine a first position of the mobile device within the venue;
    initiate a path start for a first path based on user input through a screen of the mobile device, wherein the path start is a location corresponding to the first position of the mobile device;
    after the path start is initiated, track locations of the mobile device as it is moved along the first path from the first position to a second position, while recording location information of the path;

after the moving of the mobile device, initiate a path end for the first path based on user input through a screen of the mobile device;

define a region bounded by the tracked locations of the mobile device along the first path as a first zone within the location detection system at the venue;

receive, from a user, a selection of the first zone and a split option;

track locations of the mobile device, as the user moves the mobile device along a second path within the first zone; and split the first zone into a second zone and a third zone separated from one another by lines corresponding to the second path.

15. The computer program product of claim 14, wherein the program instructions executable by the processor to cause the electronic device further to:

transmit location information of the first path and the second path to a data server.

16. The computer program product of claim 14, wherein the second position is substantially identical to the first position, whereby the first path forms a closed shape.

17. The computer program product of claim 14, wherein the second position is different from the first position, whereby the first path forms an open shape.

18. The computer program product of claim 14, wherein initiating a path end further comprises synthesizing a line segment between the first position and the second position to form a closed shape that defines the first zone.

19. The computer program product of claim 14, further comprising presenting a representation of the first zone on the screen of the mobile device.

20. The computer program product of claim 14, wherein the memory further contains instructions, which when executed by the processor, receive a zone shape for the first zone from the user.

* * * * *